T. J. KEHOE.
CLAMPING MEANS FOR VEHICLE TOPS.
APPLICATION FILED JAN. 2, 1915.
1,173,277.
Patented Feb. 29, 1916.
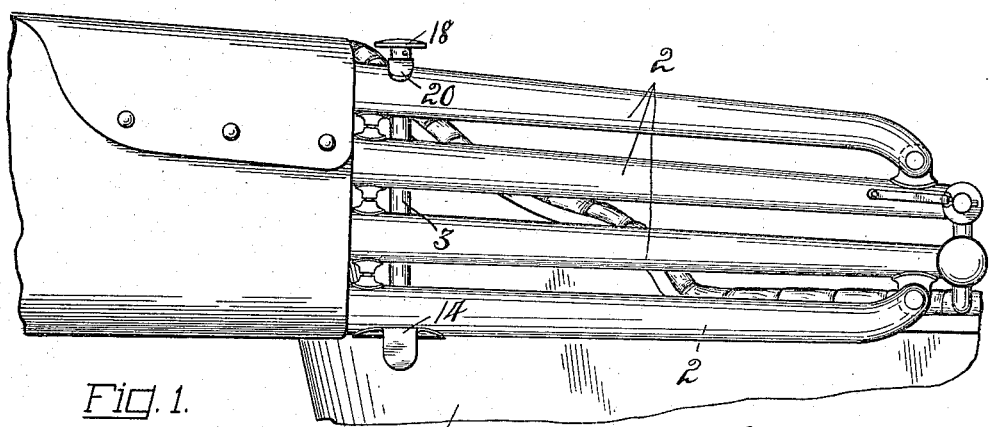
Fig. 1.
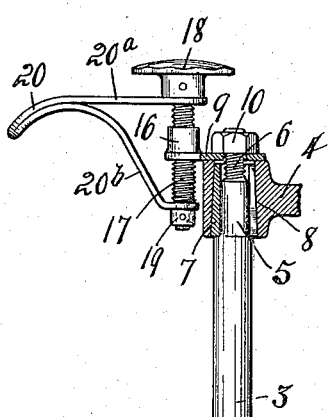
Fig. 2.
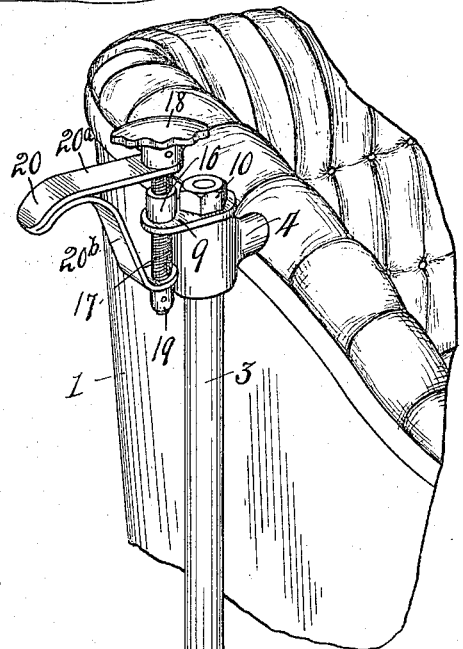
Fig. 3.
WITNESSES:-
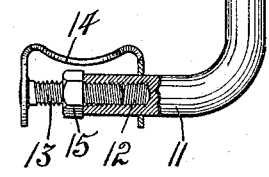
INVENTOR.
Thomas J. Kehoe,
By Owen, Owen & Crampton
His attys.
THE COLUMBIA PLANOGRAPH CO., WASHINGTON, D. C.

UNITED STATES PATENT OFFICE.

THOMAS J. KEHOE, OF TOLEDO, OHIO.

CLAMPING MEANS FOR VEHICLE-TOPS.

1,173,277.  Specification of Letters Patent.  Patented Feb. 29, 1916.

Application filed January 2, 1915. Serial No. 220.

*To all whom it may concern:*

Be it known that I, THOMAS J. KEHOE, a citizen of the United States, and a resident of Toledo, in the county of Lucas and State of Ohio, have invented a certain new and useful Clamping Means for Vehicle-Tops; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to means for use in connection with automobiles for holding the side supporting arms of the top firmly in lowered position to prevent rattling.

The primary object of my invention is the provision of simple and improved means of the character described, which is simple, strong and durable in its construction and easily and quickly operable to firmly clamp and hold the side arms of an automobile top in lowered or folded relation.

A further object of the invention is the provision of an improved support for the top when lowered which support is adjustable in a simple, improved and efficient manner transverse to the automobile body to place it in proper top supporting position.

Further objects and advantages of the invention will be apparent from the following detailed description thereof.

The invention is fully described in the following specification, and while, in its broader aspect, it is capable of embodiment in numerous forms, a preferred embodiment thereof is illustrated in the accompanying drawing, in which,—

Figure 1 is a side elevation of a portion of an automobile and the top thereof with the latter in folded relation and having its arms clamped by my improved holding means. Fig. 2 is an enlarged front elevation of the device embodying the invention with parts in section, and Fig. 3 is a perspective view thereof attached to an automobile body.

Referring to the drawings, 1 designates an automobile body and 2 the side arms of a top carried by the body, which arms when the top is in lowered or folded position recline in substantially parallel relation, as shown in Fig. 1.

The device embodying the invention comprises a vertically disposed rod 3, which is carried in pendent relation by a bracket arm 4 projecting transversely from the adjacent side of the rear portion of the automobile body, as is well understood in the art. The upper end of the rod 3 is reduced, as at 5, with the upper end of such reduced portion threaded, as at 6, and a longitudinally split sleeve 7 is mounted on the reduced portion 5. The sleeve 7 has its outer surface of conical form with its large end at the inner end of the reduced portion 5, and the bracket arm 4 is provided vertically therethrough with a tapered opening 8, which is complemental to the sleeve 7 whereby a drawing of the sleeve upward into the tapered opening 8 of the bracket arm will effect a tightening of the sleeve 7 around the rod 3 and a consequent firmly clamping of the rod to the bracket arm. When the sleeve 7 is seated within the opening 8 of the bearing bracket the threaded end 6 of the rod projects through a registering aperture in a plate 9 that is disposed over the upper end of the bracket arm 4, and a nut 10 is threaded onto said threaded end 6 and has its downward thrust against the plate 9. It is thus evident that a screwing down of the nut 10 effects both a drawing of the tapered sleeve 7 into the bracket opening 8 to firmly connect the rod to said bracket arm, and also a rigid clamping of the plate 9 to said arm.

The rod 3 has its lower end laterally angled, as at 11, so that the rod is substantially L-shape in form, and the free end of the angled part or arm 11 has a threaded opening 12 provided axially therein. A stem 13 is threaded into the opening 12 and has its outer end fixedly secured to one leg of an inverted U-shaped chair or supporting member 14 for the lower arm 2 of the top. The inner leg of the support 14 is provided with an opening through which the arm 11 of the rod 3 loosely projects, and a nut 15 is threaded on the stem 13 in position to have locking contact with the outer end of the arm 11, whereby to coöperate with said arm to securely hold the stem in adjusted position relative to said arm. It is evident that upon a loosening of the nut 15 that the stem 13 may be turned in or out relative to the arm 11 to effect a transverse adjustment of the support 14 relative to the body, and that when the desired position of adjustment has been secured, the nut 15 may be tightened against the end of the arm 11 to firmly lock the support in adjusted position.

The plate 9, which is clamped to the upper side of the bracket arm 4 by the nut 10, has one end projecting transversely of the rod 3 beyond the end of said bracket arm and provided with a vertically broadened head 16 through which a screw 17 is vertically threaded. The screw 17 is provided at its upper end with an enlarged head to facilitate a hand turning thereof, and is provided at its lower end with a relatively fixed collar or shoulder 19. A clamping finger 20 has its inner end forked with the members thereof provided adjacent to their ends with axially alined apertures through which the screw 17 loosely projects, the upper member 20ᵃ of the fork projecting from the screw 17 immediately below the head 18, and the member 20ᵇ of the fork projecting from the lower end of the screw immediately above the collar or shoulder 19. It is thus evident that the finger 20 will be caused to follow any vertical movement of the screw 17 and that the screw will be permitted to have free turning movements relative to the finger.

The finger 20 projects over the support 14 in position to coöperate with said support to clamp the interposed arms 2 of a top firmly therebetween, the clamping action taking place upon a downward screwing of the finger carrying screw 17. When it is desired to release the top preparatory for raising, the screw 17 is turned up to release the clamping engagement of the finger 20 with the upper arm 2 and to permit said finger to be swung out of vertical register with the arms 2 so as not to obstruct the raising of the arms.

It is evident that I have provided a simple and efficient top clamping means which is adjustable to suit the position of the top arms when lowered and which is easily and quickly operable to firmly clamp or release the arms of a top as may be desired.

I wish it understood that my invention is not limited to any specific construction, arrangement or form of the parts, except in so far as such limitations are specified in the claims.

Having thus described my invention, what I claim as new, and desire to secure by Letters Patent, is,—

1. In a device of the class described, a top supporting arm, a screw horizontally threaded into a part of said arm, an inverted U-shaped top supporting member carried by said screw with a leg fixed thereto and means for locking the screw in adjusted position relative to the arm.

2. In a device of the class described, a rod having a laterally projecting part, a screw threaded into the outer end of said part, an inverted U-shape top support having one leg carried by the outer end of said screw and its other leg loosely embracing said part, and means for securing the screw in adjusted relation to said part.

3. In a device of the class described, a top supporting arm having a horizontally projecting part, a top supporting member adjustable lengthwise of said part and resting in part on said arm, and a member in threaded engagement with said part for threading movements lengthwise thereof and connected to said supporting member whereby lengthwise movements of said threaded member relative to the part will communicate adjusting movements to said supporting member lengthwise of said part.

4. In a vehicle, the combination of a bracket-arm projecting from the body thereof and having a vertical opening therethrough, a top supporting member depending from said arm and having its upper end projected through the arm opening, a plate projecting from said member above the bracket-arm and having a vertically disposed threaded opening in its outer end, means for securing said member and plate in rigid relation to said arm, a screw threaded through said plate opening, and a clamping finger carried by said screw and having its inner end in pivotal forked engagement with the screw above and below said plate whereby the clamping finger may have swivel movements relative to the screw and is prevented from movements relative to the screw lengthwise thereof.

5. In a vehicle, the combination with a bracket arm projecting from the body thereof and having a tapered vertically disposed opening therethrough, a split conical bushing disposed in said opening, a rod having its upper end reduced and fitted into said bushing with the free end of said reduced portion threaded and projecting without the bracket arm opening, a plate resting on the top of the bracket arm and having an opening through which the threaded portion of said rod projects, a nut threaded to the end of said rod and bearing down on said plate, said rod having its lower end projecting laterally therefrom, a supporting chair adjustably carried by the laterally projecting end of said rod, a screw threaded vertically through said plate without said bracket arm and a clamping finger carried by said screw for longitudinal movements therewith and for rotary movements relative thereto, said finger being disposed to coöperate with said supporting chair to clamp the arms of a lowered top therebetween when the finger carrying screw is turned in one direction.

In testimony whereof, I have hereunto signed my name to this specification in the presence of two subscribing witnesses.

THOMAS J. KEHOE.

Witnesses:
F. E. AUL,
M. H. MAYERS.

Copies of this patent may be obtained for five cents each, by addressing the "Commissioner of Patents, Washington, D. C."